(12) United States Patent
Soga

(10) Patent No.: US 12,241,624 B2
(45) Date of Patent: Mar. 4, 2025

(54) PUSH BUTTON ILLUMINATION STRUCTURE, AND VEHICLE-MOUNTED APPARATUS PROVIDED WITH SAME

(71) Applicant: JVCKENWOOD Corporation, Yokohama (JP)

(72) Inventor: Kenji Soga, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 0 days.

(21) Appl. No.: 18/829,206

(22) Filed: Sep. 9, 2024

(65) Prior Publication Data

US 2024/0426472 A1 Dec. 26, 2024

Related U.S. Application Data

(63) Continuation of application No. PCT/JP2023/008451, filed on Mar. 7, 2023.

(30) Foreign Application Priority Data

Mar. 11, 2022 (JP) ................................ 2022-037901

(51) Int. Cl.
*F21V 33/00* (2006.01)
*B60K 35/10* (2024.01)
(Continued)

(52) U.S. Cl.
CPC .......... *F21V 33/0052* (2013.01); *F21V 11/16* (2013.01); *H01H 9/161* (2013.01); *H01H 13/023* (2013.01); *B60K 35/10* (2024.01); *B60K 35/22* (2024.01); *B60K 2360/128* (2024.01); *B60K 2360/139* (2024.01); *B60K 2360/166* (2024.01); *B60K 2360/34* (2024.01); *F21V 3/0625* (2018.02)

(58) Field of Classification Search
CPC ... F21V 33/0052; F21V 11/16; H01H 13/023; H01H 9/161
USPC ....................................................... 362/23.05
See application file for complete search history.

(56) References Cited

U.S. PATENT DOCUMENTS

| | | | |
|---|---|---|---|
| 2015/0062098 A1* | 3/2015 | Sakai | B29C 45/16 345/184 |
| 2015/0362658 A1* | 12/2015 | Lee | G02B 6/0095 362/23.05 |
| 2019/0122835 A1* | 4/2019 | Pan | H01H 13/023 |

FOREIGN PATENT DOCUMENTS

JP 2002289059 A 10/2002

* cited by examiner

*Primary Examiner* — Thomas M Sember
(74) *Attorney, Agent, or Firm* — Nath, Goldberg & Meyer; Jerald L. Meyer

(57) ABSTRACT

A push button illumination structure includes a light emitting base part having transparency, and a button body part configured to be molded as one body with the light emitting base part. The button body part includes: a fixed leg part configured to elastically support the light emitting base part; a push-in column configured to apply pressure to a switch; and a light shielding wall part configured to protrude on a back side of the light emitting base part, and having a frame shape. The light shielding wall part is formed at a position corresponding to an outer shape of the light emitting base part in a plan view. The push button illumination structure is configured to cause light emitted from a light source arranged inside with respect to the light shielding wall part in the plan view to be reflected by an inner surface of the light shielding wall part.

6 Claims, 8 Drawing Sheets

(51) Int. Cl.
  *B60K 35/22*   (2024.01)
  *F21V 3/06*    (2018.01)
  *F21V 11/16*   (2006.01)
  *H01H 9/16*    (2006.01)
  *H01H 13/02*   (2006.01)

PUSH BUTTON ILLUMINATION STRUCTURE, AND VEHICLE-MOUNTED APPARATUS PROVIDED WITH SAME

CROSS-REFERENCE TO RELATED APPLICATIONS

The present application is a continuation of International Application No. PCT/JP2023/008451 filed on Mar. 7, 2023, and based upon and claims the benefit of priority from Japanese Patent Application No. 2022-037901 filed on Mar. 11, 2022, the entire contents of which are incorporated herein by reference.

BACKGROUND

The present invention relates to a push button illumination structure, and a vehicle-mounted apparatus provided with the same.

JP 2002-289059 A discloses a technique for applying a light shielding tape to a part of a light source in order to prevent light leakage in a key illumination structure of an electronic device.

In a push button illumination structure that causes the entire push-in part of a push button switch to emit light, if a light shielding tape is applied to a necessary part to prevent unnecessary light leakage as described in Patent Literature 1, the following inconvenience may occur.

That is, an increase in the number of parts, or a difficulty in manufacturing a small push button switch used in a vehicle-mounted apparatus, may cause an increase in cost and a decrease in productivity. In addition, a slight shift in a position to apply the light shielding tape may be visually recognized as uneven illumination of the button, resulting in a deterioration in quality.

SUMMARY

A push button illumination structure according to a first aspect of an embodiment includes: a light emitting base part configured to be pressed and operated by an operator and having optical transparency; and a button body part configured to be molded as one body with the light emitting base part, the button body part including: a fixed leg part configured to elastically support the light emitting base part; a push-in column configured to apply pressure to a switch; and a light shielding wall part configured to protrude on a back side of the light emitting base part, and having a frame shape. The light shielding wall part is formed at a position corresponding to an outer shape of the light emitting base part, the position being inside with respect to the fixed leg part and the push-in column, in a plan view. The push button illumination structure is configured to cause light emitted from a light source arranged inside with respect to the light shielding wall part in the plan view to be reflected by an inner surface of the light shielding wall part.

A push button illumination structure according to a second aspect of the embodiment includes a housing that includes an opening part where a push button is arranged; a substrate that is arranged inside the housing to face the opening part; a switch that is arranged on the substrate; a light emitting base part that is arranged in the opening part, is exposed from the housing, and has optical transparency; a button body part that is positioned on a substrate side of the light emitting base part, is formed in one body with the light emitting base part, and has optical transparency; a light shielding wall part configured to protrude from a surface on a substrate side of the button body part toward the substrate, and having a frame shape, and the light shielding wall part being formed at a position corresponding to an outer shape of the light emitting base part in a plan view; a fixed leg part that extends outside the light shielding wall part of the button body part, and is supported by the housing, and the fixed leg part being configured to allow elastic movement of the button body part approaching the substrate; a push-in column that is raised toward the substrate outside the light shielding wall part of the button body part, and the push-in column being configured to cause the switch to operate when coming into contact with the substrate; and a light source that is arranged in a region surrounded by the light shielding wall part on the substrate in the plan view. The push button illumination structure is configured to cause light emitted from the light source and directed to a gap between the light emitting base part and the housing to be reflected by an inner surface of the light shielding wall part, which changes a traveling direction of the light to a direction other than a direction toward the gap to irradiate the button body part.

A vehicle-mounted apparatus according to a third aspect of the embodiment includes: a housing that has a box-shape and is attached to a vehicle; an image display unit that is arranged to be exposed to an opening part of a front surface of the housing; and an operation unit that includes a plurality of push buttons arranged in a frame part which is an outer side of the opening part of the housing. At least one push button of the plurality of push buttons of the operation unit is a push button to be illuminated. A push button illumination structure of the push button to be illuminated includes: a light emitting base part configured to be pressed and operated by an operator and having optical transparency; and a button body part configured to be molded as one body with the light emitting base part, the button body part including: a fixed leg part configured to elastically support the light emitting base part; a push-in column configured to apply pressure to a switch; and a light shielding wall part configured to protrude on a back side of the light emitting base part, and having a frame shape. The light shielding wall part is formed at a position corresponding to an outer shape of the light emitting base part, the position being inside with respect to the fixed leg part and the push-in column, in a plan view. The push button illumination structure is configured to cause light emitted from a light source arranged inside with respect to the light shielding wall part in the plan view to be reflected by an inner surface of the light shielding wall part.

A vehicle-mounted apparatus according to a fourth aspect of the embodiment includes: a housing that has a box-shape and is attached to a vehicle; an image display unit that is arranged to be exposed to an opening part of a front surface of the housing; and an operation unit that includes a plurality of push buttons arranged in a frame part which is an outer side of the opening part of the housing. At least one push button of the plurality of push buttons of the operation unit is a push button to be illuminated. A push button illumination structure of the push button to be illuminated, includes: the housing that includes the opening part where the push button to be illuminated is arranged; a substrate that is arranged inside the housing to face the opening part; a switch that is arranged on the substrate; a light emitting base part that is arranged in the opening part, is exposed from the housing, and has optical transparency; a button body part that is positioned on a substrate side of the light emitting base part, is formed in one body with the light emitting base part, and has optical transparency; a light shielding wall part configured to protrude from a surface on a substrate side of the button body part toward the substrate, and having a frame shape, and the light shielding wall part being formed at a position corresponding to an outer shape of the light emitting base part in a plan view; a fixed leg part that extends outside the light shielding wall part of the button body part, and is supported by the housing, and the fixed leg part being configured to allow elastic movement of the button body part approaching the substrate; a push-in column that is raised toward the substrate outside the light shielding wall part of the button body part, and the push-in column being configured to cause the switch to operate when coming into contact with the substrate; and a light source that is arranged in a region surrounded by the light shielding wall part on the substrate in the plan view. The push button illumination structure is configured to cause light emitted from the light source and directed to a gap between the light emitting base part and the housing to be reflected by an inner surface of the light shielding wall part, which changes a traveling direction of the light to a direction other than a direction toward the gap to irradiate the button body part.

DETAILED DESCRIPTION

A push button illumination structure and a vehicle-mounted apparatus provided with the same according to an embodiment will be described with a push button illumination structure BK and a vehicle-mounted apparatus 91 provided with the same as an example. The vehicle-mounted apparatus 91 according to the example is a car navigation device.

Figure 1:
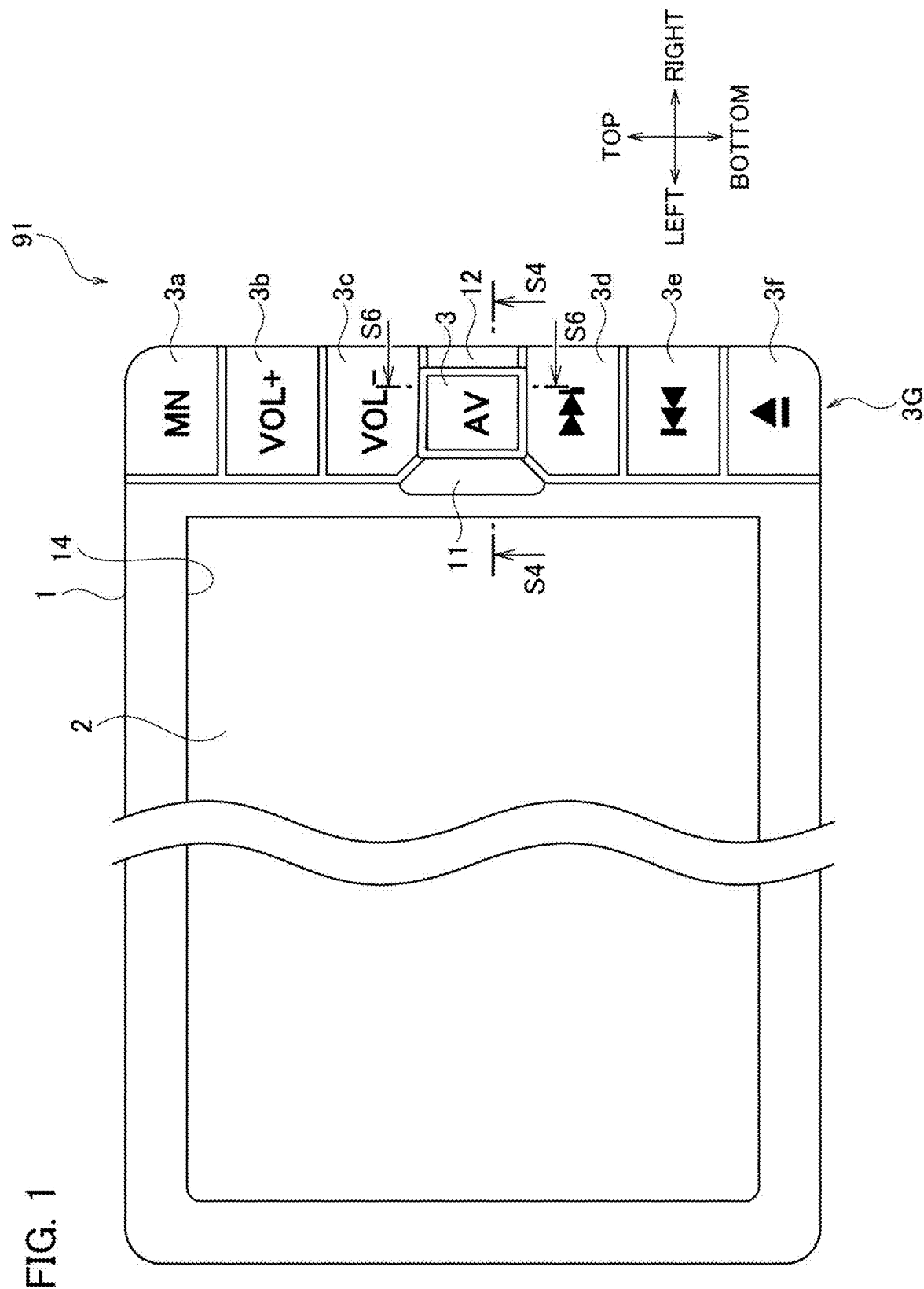
FIG. 1 is a front view of a vehicle-mounted apparatus 91 that is an example of a vehicle-mounted apparatus according to an embodiment.

FIG. 1 is a front view of the vehicle-mounted apparatus 91, which is an example of the vehicle-mounted apparatus according to the present embodiment. The vehicle-mounted apparatus 91 may be referred to as a 2DIN wide size car navigation device mounted on a dashboard of a vehicle, such as an automobile. For convenience of description, top, bottom, right, and left directions are defined by directions of arrows in FIG. 1. Further, a near side of the page space of FIG. 1 is defined as a front side, and a back side of the page space is defined as a rear side.

The vehicle-mounted apparatus 91 includes a housing 1, an image display unit 2, and an operation unit 3G. The housing 1 has a hexahedral box shape, and an opening part 14 at the center of a front part thereof. The front part having the opening part 14 is formed in a frame shape to expose the image display unit 2 in the opening part 14. The operation unit 3G is arranged in a part that is a frame part on a right outer side of the opening part 14. The operation unit 3G includes multiple push buttons 3a to 3c, 3, and 3d to 3f arranged in the vertical direction.

In the push button 3 located at the center in the vertical direction of the operation unit 3G, a finger-press part (part that an operator presses and operates) is exposed as a button decoration part 32 having a rectangular shape in a front view. The button decoration part 32 is smaller than the other push buttons 3a to 3c, and 3d to 3f in the lateral direction. However, the button decoration part 32 is designed to emphasize the push button 3 by extending an edge part 11 and an edge part 12 of the housing 1 to the left and right of the push button 3, respectively.

Figure 2:
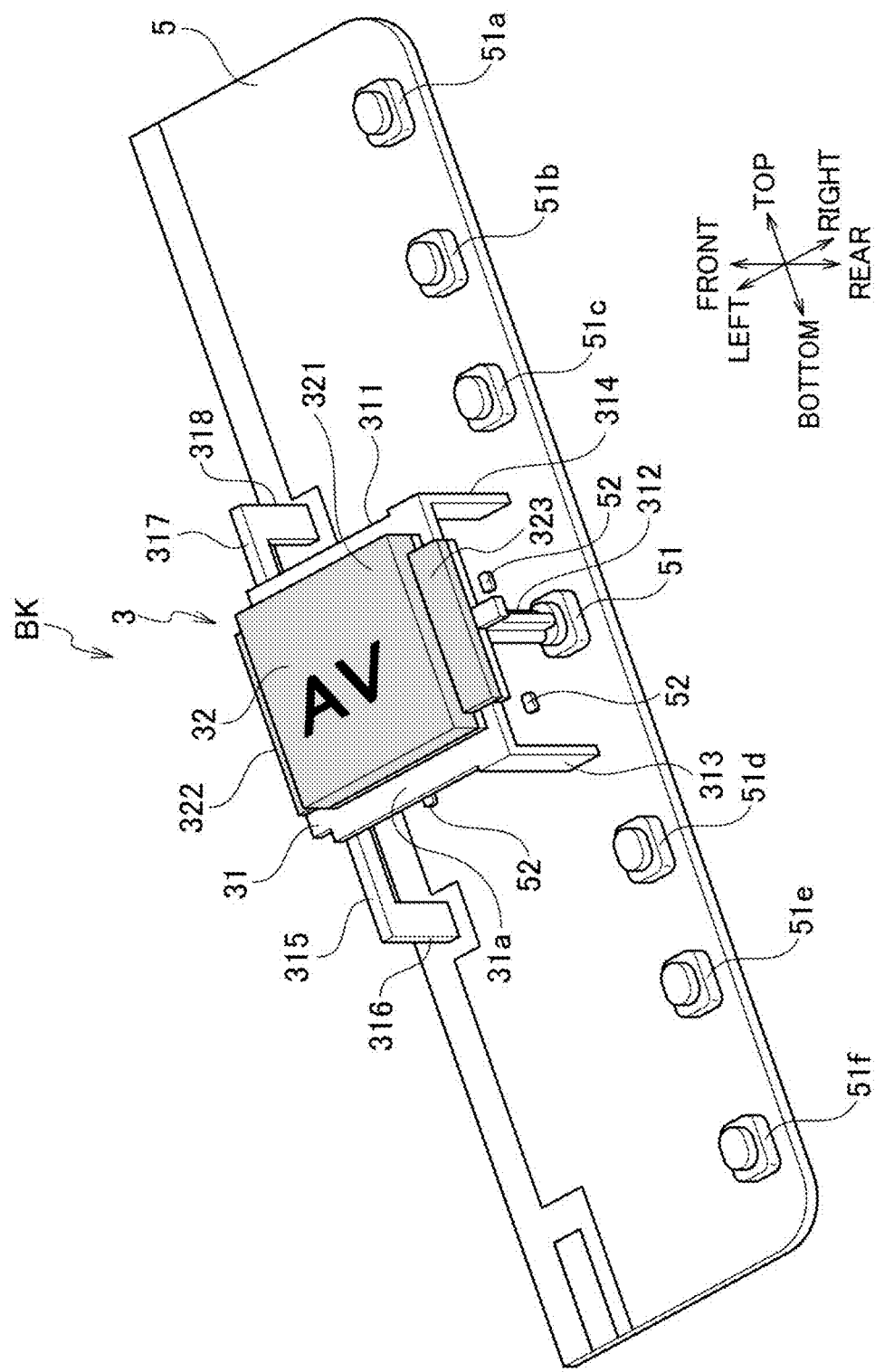
FIG. 2 is a perspective view illustrating a push button illumination structure BK that is an example of a push button illumination structure according to the embodiment.

FIG. 2 is a perspective view illustrating an internal structure of the operation unit 3G when viewed from lower right obliquely forward. In FIG. 2, the push buttons 3a to 3c and push buttons 3d to 3f are not illustrated, and only the push button 3 is illustrated.

The operation unit 3G includes a substrate 5, switches 51a to 51c, 51, and 51d to 51f mounted on a surface at a front side of the substrate 5, and multiple light emitting elements 52 as light sources. In this example, the switches 51a to 51c, 51, and 51d to 51f are tactile switches.

The switches 51a to 51c, 51, and 51d to 51f are mounted at positions corresponding to the push buttons 3a to 3c, 3, and 3d to 3f, respectively. There are four light emitting elements 52 in this example. In the front view, the multiple light emitting elements 52 are mounted at a distance from each other at positions corresponding to apexes of a rectangle within a range included in the button decoration part 32 on the substrate 5.

Figure 3:
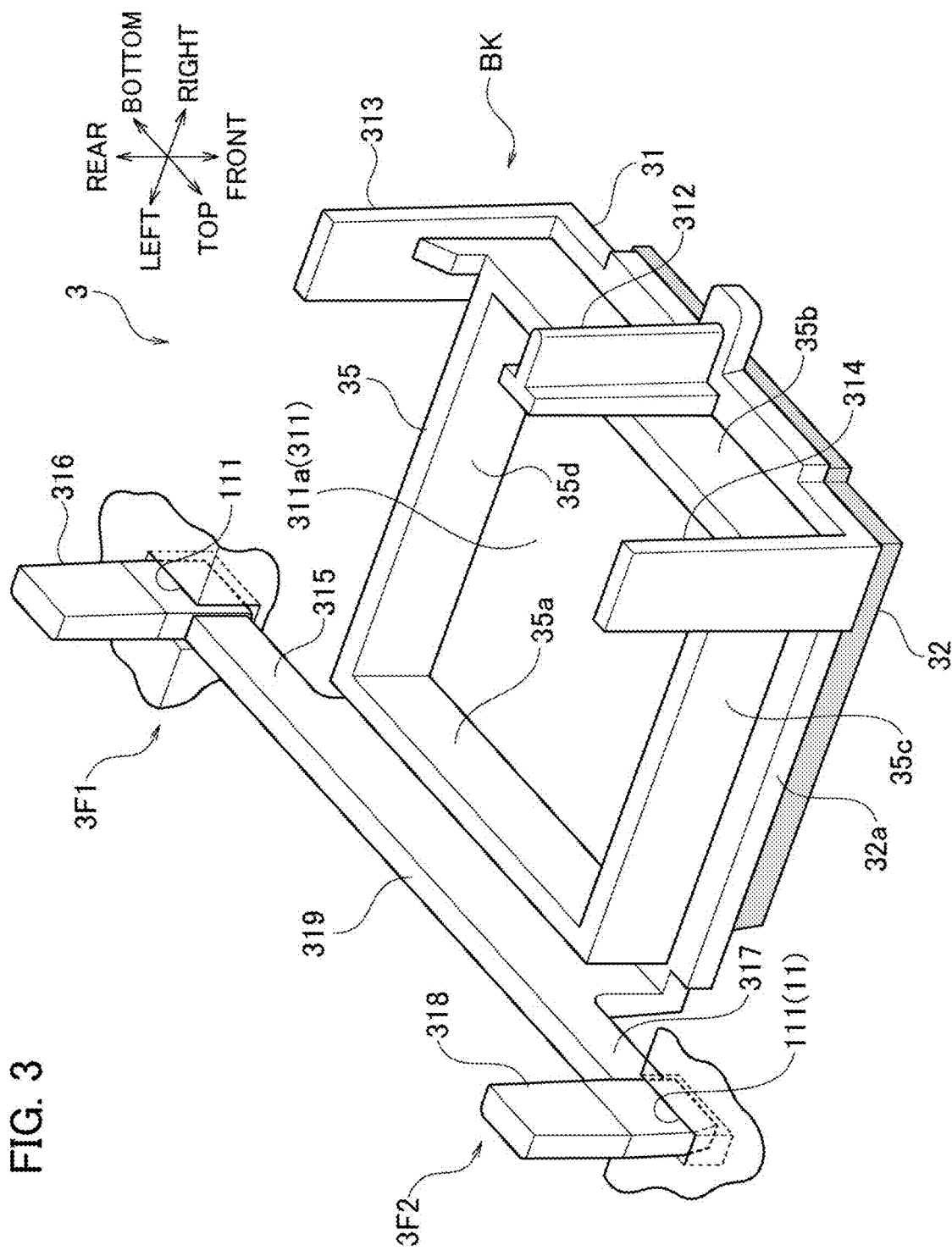
FIG. 3 is a perspective view illustrating a push button 3.
Figure 4:
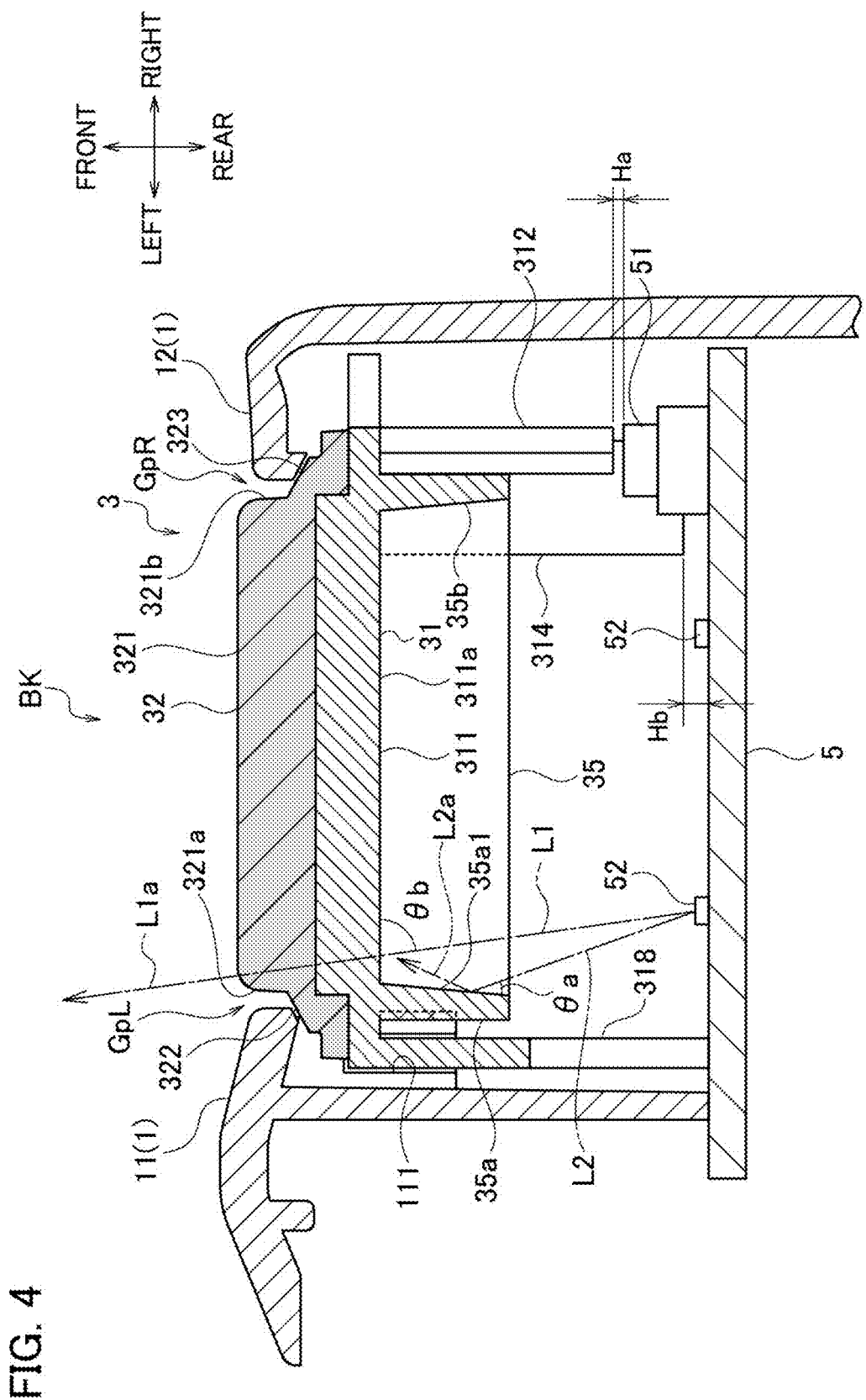
FIG. 4 is a cross-sectional view taken along S4-S4 in FIG. 1 for illustrating illumination operation in the push button illumination structure BK.

The push button 3 will be further described in detail with reference to FIGS. 3 and 4. FIG. 3 is a perspective view illustrating the push button illumination structure BK including the push button 3, which is viewed from upper right obliquely rearward. FIG. 4 is a cross-sectional view taken along S4 to S4 in FIG. 1 for illustrating illumination operation of the push button illumination structure BK.

The push button 3 is a button that pushes in the switch 51 to conduct electricity to a contact, and includes a button body part 31 and the button decoration part 32.

The button body part 31 is formed of a milky white resin. The button decoration part 32 is formed with a colored (e.g., blue) resin having optical transparency. An example of a resin that can be used for the button body part 31 is PC (polycarbonate resin). An example of a resin that can be used for the button decoration part 32 is PMMA (polymethyl methacrylate resin). The button body part 31 and the button decoration part 32 are molded as one body. Specifically, the button body part 31 and the button decoration part 32 are formed as one body through two-color molding, for example.

As illustrated in FIG. 3, the button body part 31 has a base part 311 having a rectangular plate shape, regulating leg parts 313 and 314, a sidewall part 319, a first fixed leg part 3F1, a second fixed leg part 3F2, a push-in column 312, and a light shielding wall part 35.

The regulating leg parts 313 and 314 are plate-shaped parts extending rearward from a lower right corner part and an upper right corner part of the base part 311, respectively.

The sidewall part 319 is a wall raised rearward from a left edge part of the base part 311. A rear end position of the sidewall part 319 is located forward of a rear end position of the regulating leg parts 313 and 314.

The first fixed leg part 3F1 is formed to extend further downward from a lower rear end part of the sidewall part 319. The first fixed leg part 3F1 includes a leg part 315 extending linearly downward, and a fixed leg part 316 extending rearward from a distal end part of the leg part 315.

The second fixed leg part 3F2 is formed to extend further upward from an upper rear end part of the sidewall part 319. The second fixed leg part 3F2 includes a leg part 317 extending linearly upward, and a fixed leg part 318 extending rearward from a distal end part of the leg part 317.

The fixed leg part 316 and the fixed leg part 318, which are the distal end parts, are supported by engaging at their root parts with groove parts 111 formed in the edge part 11 of the housing 1. In this state, each of the fixed leg part 316 and fixed leg part 318 is arranged between the housing 1 and the substrate 5 to be sandwiched between the housing 1 and the substrate 5. More specifically, as illustrated in FIGS. 3 and 4, movement of the button body part 31 in the vertical direction and lateral direction with respect to the housing 1 in a natural state is restricted by the engagement of the root parts of the fixed leg parts 316 and 318 with the groove parts 111.

Further, since the distal ends of the fixed leg parts 316 and 318 in this state are in contact with the substrate 5, movement of the button body part 31 rearward with respect to the housing 1 in the natural state is restricted.

The push-in column 312 is provided at a center part in the vertical direction near a right edge part of the base part 311, and is raised rearward. As illustrated in FIG. 2, the push-in column 312 is a member for pushing the contact point of the switch 51, is formed to have a T-shaped cross-sectional shape, and has high rigidity.

As illustrated in FIG. 4, in the natural state, the push-in column 312 is arranged to face a top surface (upper surface in FIG. 4) of the switch 51 at a position where the tip of the push-in column 312 is spaced forward by a predetermined distance Ha from the top surface.

In contrast, the regulating leg part 313 (not illustrated in FIG. 4) and the regulating leg part 314 are spaced forward by a predetermined distance Hb from a top surface (upper surface in FIG. 4) of the substrate 5. Here, the distance Hb is set as a distance (Hb=Ha+Ha2) obtained by adding a push-in margin amount Ha2 to the distance Ha so that the switch 51 can be pushed in up to the push-in margin amount Ha2, which exceeds a push-in amount Ha1 required for the switch 51 to operate. Thus, even when an operator pushes in to the push-in margin amount Ha2 beyond the push-in amount Ha1, the tip of the regulating leg part 313 or the regulating leg part 314 comes into contact with the substrate 5, thereby preventing the push-in column 312 from being excessively pushed into the switch 51.

When the push button 3 is pushed in at any position of the base part 311, the first fixed leg part 3F1 and the second fixed leg part 3F2 elastically deform sufficiently. The elastic deformation of the first fixed leg part 3F1 and the second fixed leg part 3F2 allows the base part 311 to move closer to the substrate 5. By this movement, the push-in column 312 applies pressure to and pushes in the switch 51.

As illustrated in FIGS. 2 and 4, the button decoration part 32 is a part that is exposed from the housing 1 and is capable of applying a force toward the substrate 5 when operated by a finger. The button decoration part 32 includes a light emitting base part 321 having a rectangular plate shape, and flange parts 322 and 323 extending therefrom at positions lower than the light emitting base part 321. Here, the flange part 322 extends leftward from an edge part 321a, on the left, of the light emitting base part 321. The flange part 323 extends rightward from an edge part 321b, on the right, of the light emitting base part 321. The upper and lower edge parts of the button decoration part 32 are not provided with flange parts.

Figure 6:
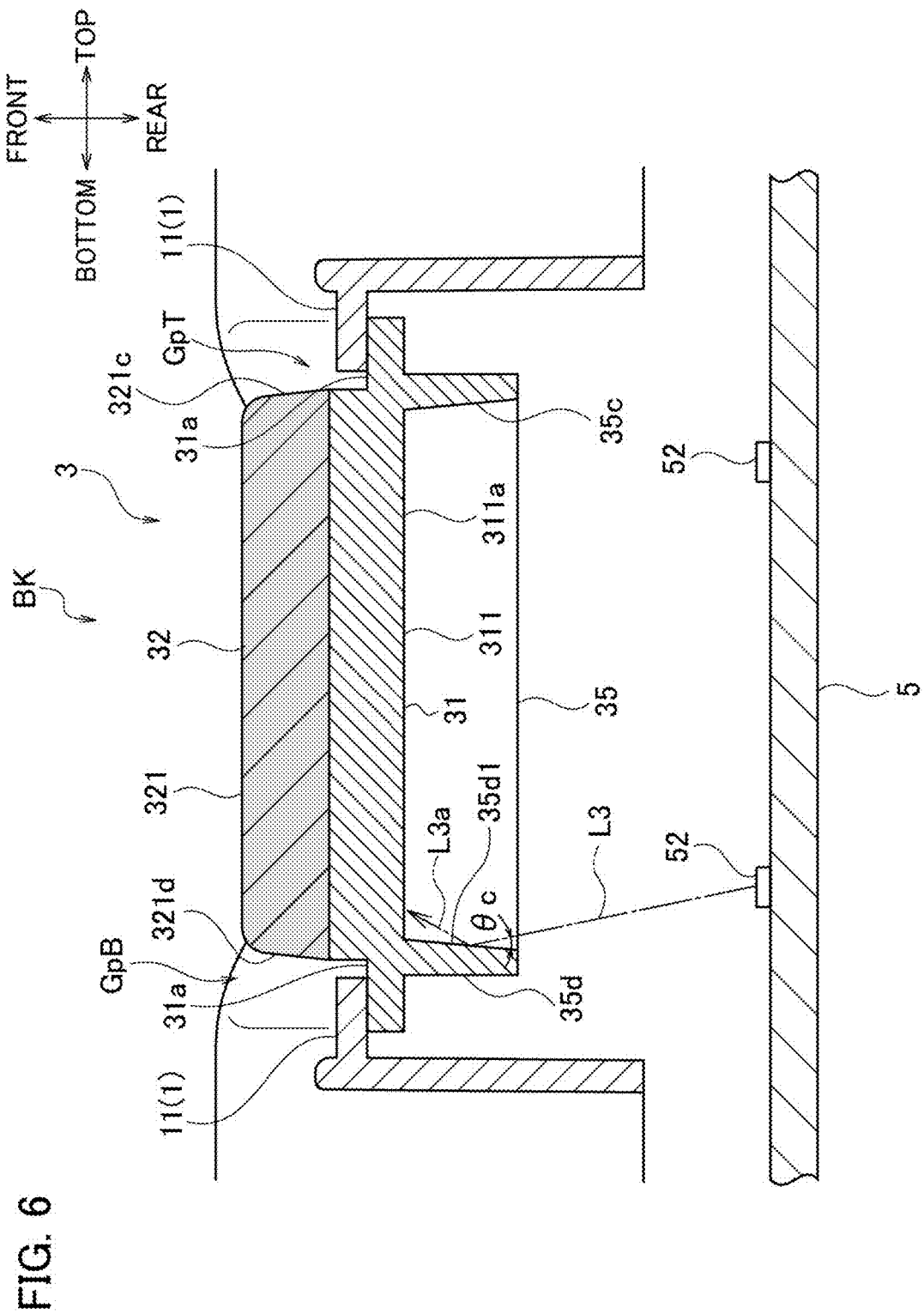
FIG. 6 is a cross-sectional view taken along S6-S6 in FIG. 1 for illustrating illumination operation in the push button illumination structure BK.

As illustrated in FIGS. 4 and 6, the button body part 31 includes the light shielding wall part 35 protruding rearward in a shape of a rectangular frame at positions corresponding to the left and right edge parts 321a, 321b, and upper and lower edge parts 321c, 321d of the light emitting base part 321 on a rear surface 311a of the base part 311, which is on the substrate 5 side. Here, the light shielding wall part 35 is a frame-shaped wall part protruding from the light emitting base part 321, on a back surface side thereof, in the button body part 31. In other words, the rear surface 311a of the base part 311, which is on the substrate 5 side thereof, where the light shielding wall part 35 is formed, is a surface of the base part 311 on an opposite side (the lower side in FIG. 4) to a side (the upper side in FIG. 4) where the light emitting base part 321 is disposed.

Specifically, as illustrated in FIG. 4, the light shielding wall part 35 includes a light shielding wall part 35a at a position corresponding to the edge part 321a, and a light shielding wall part 35b at a position corresponding to the edge part 321b. Further, as illustrated in FIG. 6, the light shielding wall part 35 includes a light shielding wall part 35c at a position corresponding to the edge part 321c, and a light shielding wall part 35d at a position corresponding to the edge part 321d. That is, the light shielding wall part 35 is formed at a position corresponding to the outer shape of the light emitting base part 321.

The four light emitting elements 52 are arranged on the substrate 5 at positions which are closer to the light shielding wall part 35 than a center position of the light emitting base part 321, and are inside with respect to the light shielding wall part 35 in the front view (plan view).

As illustrated in FIG. 4, of light emitted from the light emitting element 52, light L1 that directly reaches the rear surface 311a of the base part 311 enters the rear surface 311a at an incident angle $\theta b$. Here, the rear surface 311a is a surface facing the substrate 5 in parallel, and the incident angle $\theta b$ is sufficiently larger than a critical angle $\alpha$ for total reflection at the rear surface 311a.

Thus, the light L1 enters the base part 311 without being substantially reflected thereby. Then, the light L1 directly enters the light emitting base part 321 of the button decoration part 32 from the button body part 31. The light L1 is emitted as illumination light L1a from a front surface of the light emitting base part 321 to the outside.

Thus, the light emitting base part 321 is visually recognized from the outside as if it were emitting light in the color of the button decoration part 32.

The critical angle $\alpha$ is determined by a refractive index of a member. For example, when the button body part 31 is formed of PC (polycarbonate), since the refractive index of PC is generally 1.585, the critical angle $\alpha$ is obtained from an equation $\sin \alpha / \sin 90° = 1/1.585$, and $\alpha = 39.1°$.

Next, walls of the light shielding wall part 35 in the lateral direction will be described with reference to FIGS. 4 and 5. Here, a gap GpL is defined as a gap between the edge part 321a on the left of the light emitting base part 321, and the edge part 11 of the housing 1. A gap GpR is defined as a gap between the edge part 321b on the right of the light emitting base part 321, and the edge part 12 of the housing 1.

As illustrated in FIG. 4, light L2 emitted from the light emitting element 52 in a direction of the gap GpL directly reaches the inner surface 35a1 of the light shielding wall part 35a, which is close to the light emitting element 52.

Since the inner surface 35a1 extends in a direction substantially orthogonal to the substrate 5, an incident angle θa of the light L2 with respect to the inner surface 35a1 is sufficiently smaller than the critical angle α. Thus, the light L2 is totally reflected by the inner surface 35a1 to be directed toward the rear surface 311a of the base part 311 as reflected light L2a. That is, the light L2 irradiates the rear surface 311a of the base part 311 of the button body part 31 as the reflected light L2a, which is reflected by the inner surface 35al of the light shielding wall part 35 causing a change in its traveling direction to a direction other than the direction toward the gap GpL. That is, the light L2 is irradiated through reflection at the inner surface 35a1, changing the traveling direction to a part other than the gap GpL.

Therefore, no light is emitted from the light emitting element 52 to the outside through the gap GpL between the edge part 321a on the left of the light emitting base part 321, and the edge part 11 of the housing 1. Thus, a part along the gap GpL is visually recognized as a dark part from the outside. The same applies to the gap GpR between the edge part 321b on the right of the light emitting base part 321, and the edge part 12 of the housing 1.

Figure 5:
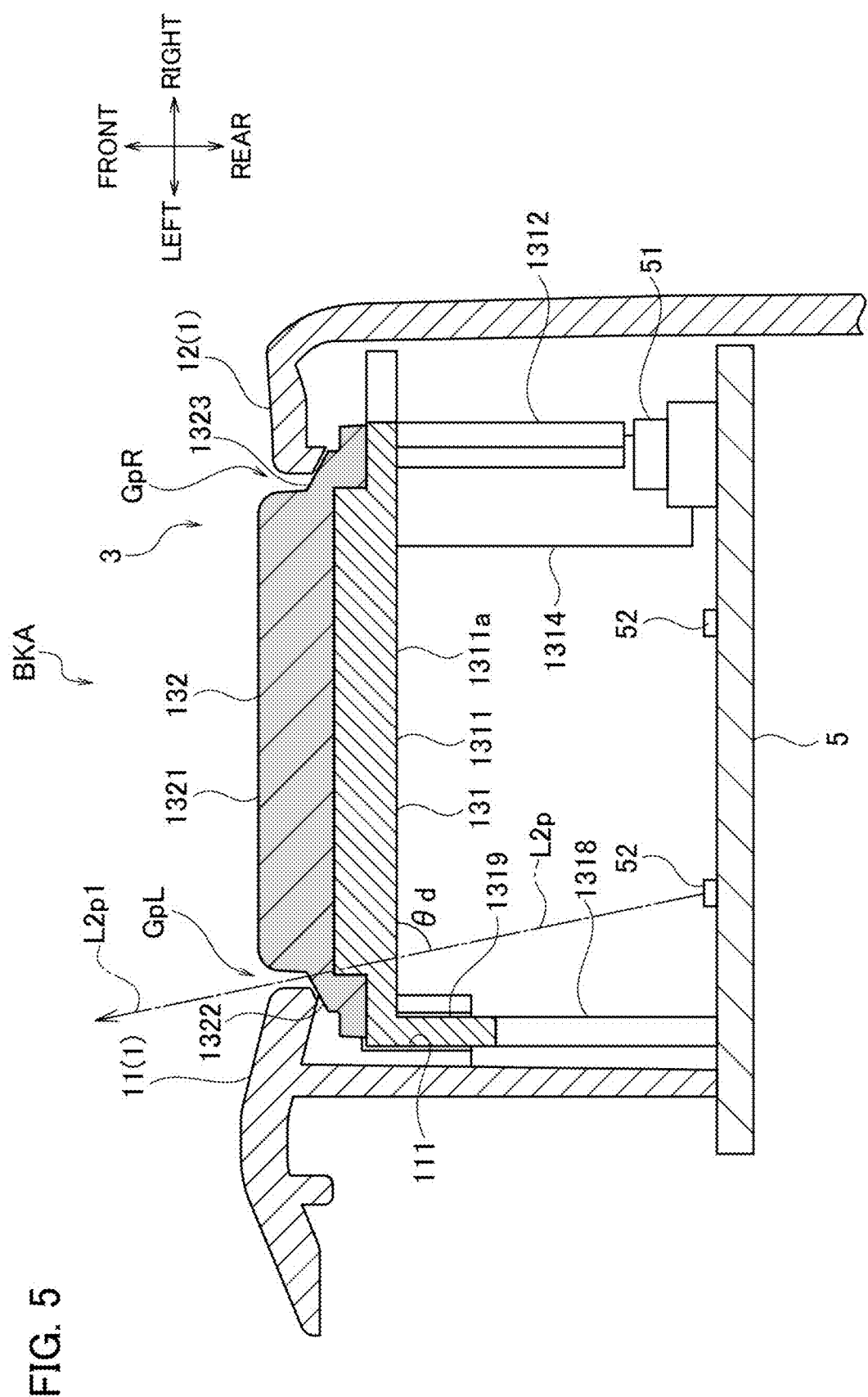
FIG. 5 is a first cross-sectional view for illustrating illumination operation in a push button illumination structure BKA of a comparative example.

FIG. 5 is a diagram for illustrating a light path in the push button illumination structure BKA using a button body part 131 where the light shielding wall part 35 in the lateral direction is not formed, instead of using the button body part 31 in FIG. 3.

As illustrated in FIG. 5, light L2p emitted from the light emitting element 52 toward the gap GpL on the left directly reaches a rear surface 1311a of a base part 1311 corresponding to the base part 311 because there is no light shielding wall part 35. An incident angle of the light L2p with respect to the rear surface 1311a is an incident angle θd, larger than the critical angle α, and thus the light L2p enters the inside of the base part 1311. Then, the light L2p passes through a flange 1322 of the button decoration part 132 and is emitted from the gap GpL to the outside as peripheral leakage light L2p1 from the light emitting base part 1321. This is also the same when light emitted from the light emitting element 52 passes through a flange 1323 of the button decoration part 132 on the right, and is emitted from the gap GpR to the outside.

Thus, the peripheral leakage light L2p1 is visually recognized as left-right leakage light leaked to the outside of left and right edges of the light emitting base part 1321. The peripheral leakage light L2p1 becomes blue light, which is the color of the button decoration part 132, when it passes through the flange 1322. Thus, the outline of the light emitting base part 1321 becomes obscure, and illumination quality of the button deteriorates.

Next, the light shielding wall part 35 in the vertical direction will be described with reference to FIGS. 6 and 7.

As illustrated in FIG. 6, light L3 emitted from the light emitting element 52 toward a gap GpB directly reaches an inner surface 35d1 of the light shielding wall part 35d, which is close to the light emitting element 52.

Since the inner surface 35d1 extends in a direction substantially perpendicular to the substrate 5, an incident angle θc of the light L3 with respect to the inner surface 35d1 is sufficiently smaller than the critical angle α. That is, the light L3 is totally reflected by the inner surface 35d1 to be directed as reflected light L3a toward the rear surface 311a of the base part 311.

Therefore, no light is emitted from the light emitting element 52 to the outside through the gap GpB between the edge part 321d on the lower side of the light emitting base part 321, and the edge part 11 on the lower side of the housing 1. Thus, a part along the gap GpB is visually recognized as a dark part from the outside. The same applies to a gap GpT between the edge part 321c on the upper side of the light emitting base part 321 and the edge part 11 on the upper side of the housing 1.

Figure 7:
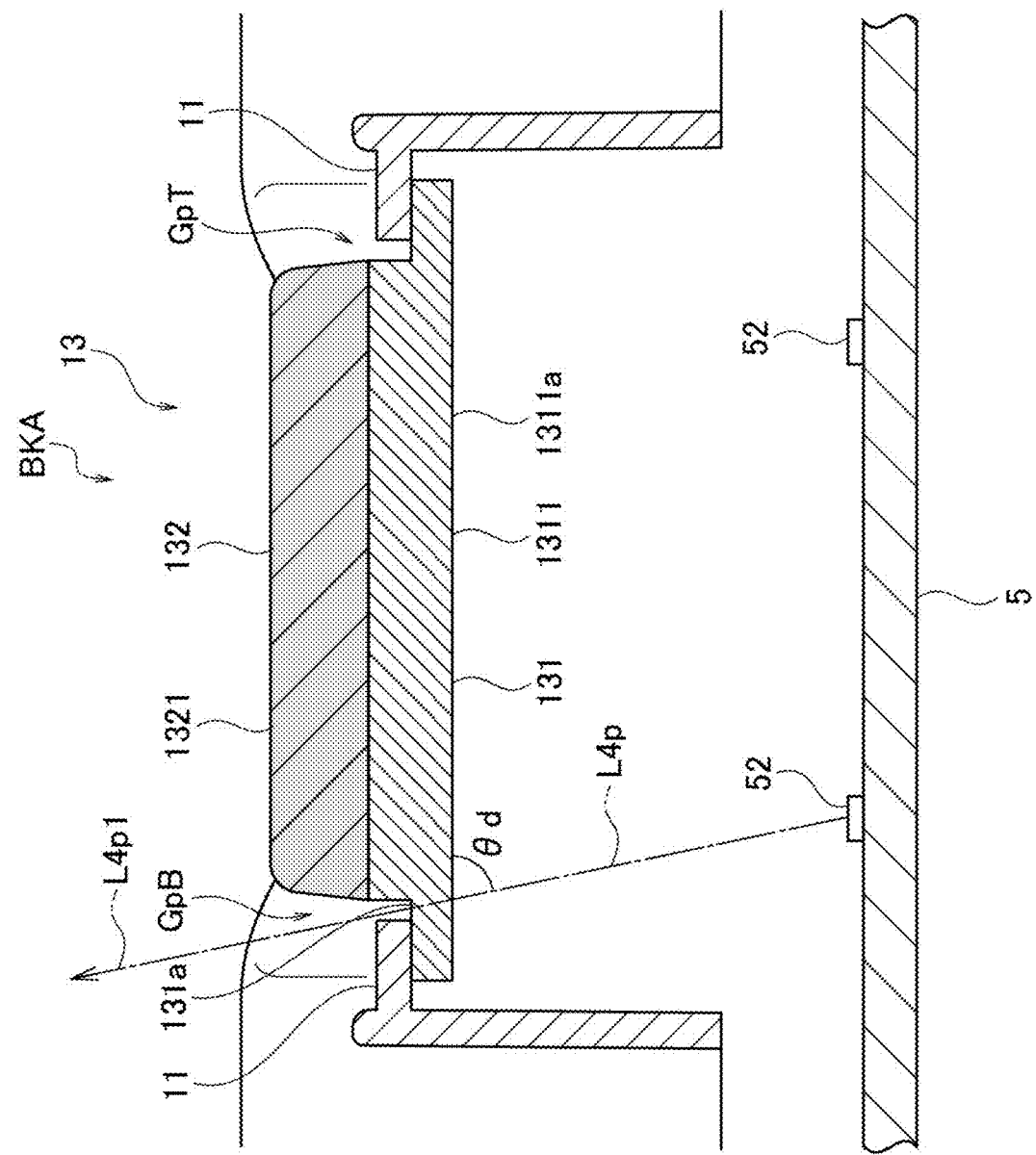
FIG. 7 is a second cross-sectional view for illustrating illumination operation in the push button illumination structure BKA of the comparative example.

FIG. 7 is a diagram for illustrating a light path in the push button illumination structure BKA using the button body part 131, where the light shielding wall part 35 is not formed, instead of using the button body part 31 in FIG. 3.

As illustrated in FIG. 7, light L4p emitted from the light emitting element 52 toward the gap GpB directly reaches the rear surface 1311a of the base part 1311 because there is no light shielding wall part 35. An incident angle of the light L4p with respect to the rear surface 1311a is the incident angle θd, which is larger than the critical angle α. Thus, the light L4p enters the inside of the button body part 131. Since upper and lower edges of the light emitting base part 1321 have no flanges, the light L4p passes through the button body part 131 to be emitted to the outside from the gap GpB. That is, the light L4p is emitted as light L4p1 that leaks above and below the light emitting base part 1321. The same applies to the gap GpT on the upper side.

Thus, the light L4p1 leaking is visually recognized at the outside of upper and lower edges of the light emitting base part 1321. The light emitting base part 1321 is not interposed between the gap GpB and the light emitting element 52, and between the gap GpT and the light emitting element 52. Thus, the light L4p1, which vertically leaks, becomes light having a high lightness of the color (milky white) of the button body part 131, which is not blue, and thus illumination quality of the button greatly deteriorates.

Figure 8A:
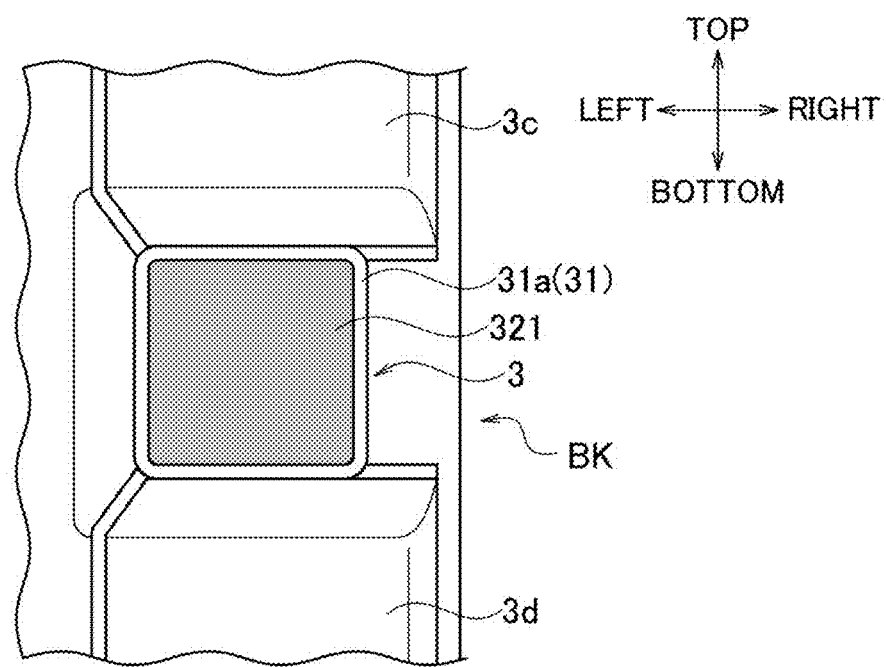
FIG. 8A is a front view illustrating an illumination mode in the push button illumination structure BK.

FIG. 8A is a front view illustrating a light emitting state of the push button illumination structure BK using the button body part 31 having the light shielding wall part 35 described with reference to FIGS. 4 and 6. The light emitting base part 321 of the button decoration part 32 emits light with a clear outline (gray part), and the illumination quality of the button is maintained high.

Figure 8B:
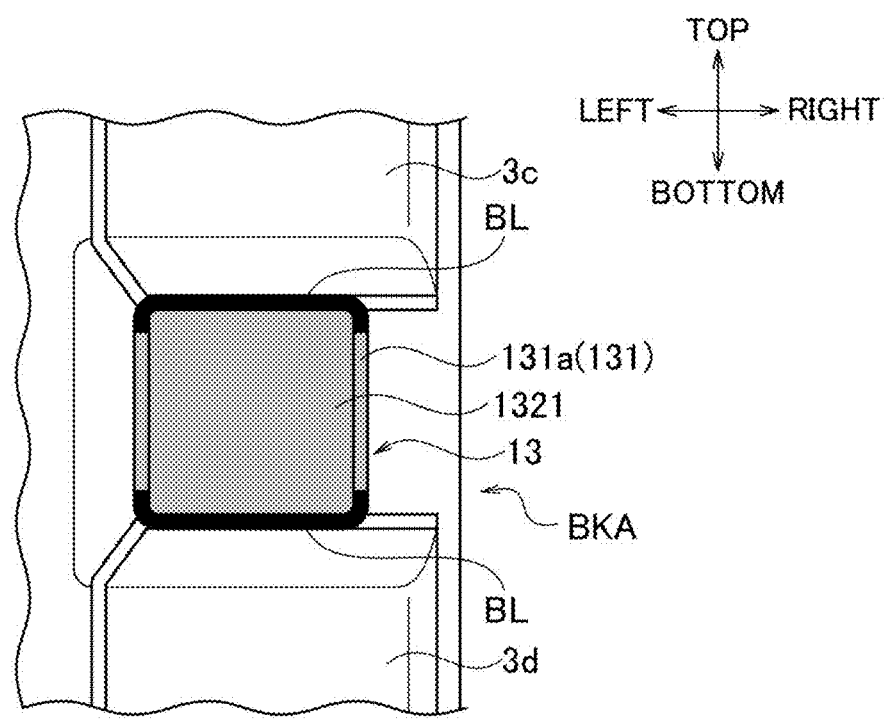
FIG. 8B is a front view illustrating an illumination mode in the push button illumination structure BKA of the comparative example.

FIG. 8B is a front view illustrating a light emitting state of the push button illumination structure BKA using the button body part 131 not having the light shielding wall part 35, described with reference to FIGS. 5 and 7. The left edge and right edge of the light emitting base part 1321 of the button decoration part 132 are unclear (even the edges are gray) due to the peripheral leakage light L2p1. Outside the upper edge and lower edge of the light emitting base part 1321 of the button decoration part 132, a light emitting part BL having a high brightness different from that of the light emitting base part 1321 is visually recognized. Thus, the quality of the button illumination deteriorates. The light emitting part BL is illustrated as a region having the darkest color in FIG. 8B.

As described above, in the push button illumination structure BK of the example, a light shielding member, and work needed for applying the light shielding member, are unnecessary, thereby controlling cost increases. In the push button illumination structure BK, the light shielding wall part 35 is formed as one body with the button body part 31, thereby improving production workability. In the push button illumination structure BK, the light emitting base part 321 of the button decoration part 32 clearly emits light, thereby having illumination of high quality.

The example described in detail above is not limited to the configuration thereof, and may be modified to the extent of not departing from the gist of the present invention.

The shape of the light shielding wall part 35, and inclination angles of the inner surface 35a1 to 35d1 may be appropriately set in accordance with a critical angle based on a refractive index of a resin that forms the light shielding wall part 35.

That is, the shape of the light shielding wall part 35 and the position of the light emitting elements 52 may be set in such a manner that θa, θc<(α=) 39.1°<θb, θd for light from the light emitting element 52 to the gaps GpL, GpR, GpB, and GpT.

While embodiments of the present invention have been described as above, the discussion and drawings forming part of this disclosure should not be understood as limiting the invention. Various alternative embodiments, examples, and operating techniques will become apparent to those skilled in the art from this disclosure.

What is claimed is:

1. A push button illumination structure, comprising:
   a light emitting base part configured to be pressed and operated by an operator and having optical transparency; and
   a button body part configured to be molded as one body with the light emitting base part, the button body part including: a fixed leg part configured to elastically support the light emitting base part; a push-in column configured to apply pressure to a switch; and a light shielding wall part configured to protrude on a back side of the light emitting base part, and having a frame shape, wherein
   the light shielding wall part is formed at a position corresponding to an outer shape of the light emitting base part, the position being inside with respect to the fixed leg part and the push-in column, in a plan view, and
   the push button illumination structure is configured to cause light emitted from a light source arranged inside with respect to the light shielding wall part in the plan view to be reflected by an inner surface of the light shielding wall part.

2. The push button illumination structure according to claim 1, wherein the inner surface of the light shielding wall part is formed such that an incident angle of light emitted from the light source is smaller than a critical angle determined by a material of the button body part.

3. A vehicle-mounted apparatus, comprising:
   a housing that has a box-shape and is attached to a vehicle;
   an image display unit that is arranged to be exposed to an opening part of a front surface of the housing; and
   an operation unit that includes a plurality of push buttons arranged in a frame part which is an outer side of the opening part of the housing, wherein
   at least one push button of the plurality of push buttons of the operation unit is a push button to be illuminated, and
   a push button illumination structure of the push button to be illuminated, comprising:
      a light emitting base part configured to be pressed and operated by an operator and having optical transparency; and
      a button body part configured to be molded as one body with the light emitting base part, the button body part including: a fixed leg part configured to elastically support the light emitting base part; a push-in column configured to apply pressure to a switch; and a light shielding wall part configured to protrude on a back side of the light emitting base part, and having a frame shape, wherein
      the light shielding wall part is formed at a position corresponding to an outer shape of the light emitting base part, the position being inside with respect to the fixed leg part and the push-in column, in a plan view, and
      the push button illumination structure is configured to cause light emitted from a light source arranged inside with respect to the light shielding wall part in the plan view to be reflected by an inner surface of the light shielding wall part.

4. A push button illumination structure, comprising:
   a housing that includes an opening part where a push button is arranged;
   a substrate that is arranged inside the housing to face the opening part;
   a switch that is arranged on the substrate;
   a light emitting base part that is arranged in the opening part, is exposed from the housing, and has optical transparency;
   a button body part that is positioned on a substrate side of the light emitting base part, is formed in one body with the light emitting base part, and has optical transparency;
   a light shielding wall part configured to protrude from a surface on a substrate side of the button body part toward the substrate, and having a frame shape, and the light shielding wall part being formed at a position corresponding to an outer shape of the light emitting base part in a plan view;
   a fixed leg part that extends outside the light shielding wall part of the button body part, and is supported by the housing, and the fixed leg part being configured to allow elastic movement of the button body part approaching the substrate;
   a push-in column that is raised toward the substrate outside the light shielding wall part of the button body part, and the push-in column being configured to cause the switch to operate when coming into contact with the substrate; and
   a light source that is arranged in a region surrounded by the light shielding wall part on the substrate in the plan view, wherein
   the push button illumination structure is configured to cause light emitted from the light source and directed to a gap between the light emitting base part and the housing to be reflected by an inner surface of the light shielding wall part, which changes a traveling direction of the light to a direction other than a direction toward the gap to irradiate the button body part.

5. The push button illumination structure according to claim 4, wherein the inner surface of the light shielding wall part is formed such that an incident angle of light emitted from the light source is smaller than a critical angle determined by a material of the button body part.

6. A vehicle-mounted apparatus comprising:
   a housing that has a box-shape and is attached to a vehicle;
   an image display unit that is arranged to be exposed to an opening part of a front surface of the housing; and an operation unit that includes a plurality of push buttons arranged in a frame part which is an outer side of the opening part of the housing, wherein at least one push button of the plurality of push buttons of the operation unit is a push button to be illuminated, and a push button illumination structure of the push button to be illuminated, comprising:

the housing that includes the opening part where the push button to be illuminated is arranged;

a substrate that is arranged inside the housing to face the opening part;

a switch that is arranged on the substrate;

a light emitting base part that is arranged in the opening part, is exposed from the housing, and has optical transparency;

a button body part that is positioned on a substrate side of the light emitting base part, is formed in one body with the light emitting base part, and has optical transparency;

a light shielding wall part configured to protrude from a surface on a substrate side of the button body part toward the substrate, and having a frame shape, and the light shielding wall part being formed at a position corresponding to an outer shape of the light emitting base part in a plan view;

a fixed leg part that extends outside the light shielding wall part of the button body part, and is supported by the housing, and the fixed leg part being configured to allow elastic movement of the button body part approaching the substrate;

a push-in column that is raised toward the substrate outside the light shielding wall part of the button body part, and the push-in column being configured to cause the switch to operate when coming into contact with the substrate; and a light source that is arranged in a region surrounded by the light shielding wall part on the substrate in the plan view, wherein the push button illumination structure is configured to cause light emitted from the light source and directed to a gap between the light emitting base part and the housing to be reflected by an inner surface of the light shielding wall part, which changes a traveling direction of the light to a direction other than a direction toward the gap to irradiate the button body part.

* * * * *